(12) United States Patent
Srinivasan et al.

(10) Patent No.: US 10,841,667 B2
(45) Date of Patent: Nov. 17, 2020

(54) PRODUCING VIDEO DATA

(71) Applicant: MIRRIAD ADVERTISING PLC, London (GB)

(72) Inventors: Ram Srinivasan, London (GB); Phillip McLauchlan, London (GB)

(73) Assignee: MIRRIAD ADVERTISING PLC, London (GB)

( * ) Notice: Subject to any disclaimer, the term of this patent is extended or adjusted under 35 U.S.C. 154(b) by 165 days.

(21) Appl. No.: 16/161,750

(22) Filed: Oct. 16, 2018

(65) Prior Publication Data
US 2019/0052938 A1 Feb. 14, 2019

Related U.S. Application Data

(63) Continuation of application No. 15/076,323, filed on Mar. 21, 2016, now abandoned, which is a
(Continued)

(51) Int. Cl.
*H04N 21/858* (2011.01)
*H04N 21/234* (2011.01)
(Continued)

(52) U.S. Cl.
CPC ..... *H04N 21/8583* (2013.01); *H04N 21/2353* (2013.01); *H04N 21/2393* (2013.01);
(Continued)

(58) Field of Classification Search
None
See application file for complete search history.

(56) References Cited

U.S. PATENT DOCUMENTS 6,615,408 B1 * 9/2003 Kaiser ............... G06Q 30/02
725/112
10,210,541 B2 * 2/2019 Kanter ............ G06Q 30/0246
(Continued)

FOREIGN PATENT DOCUMENTS

EP 2765781 A1 7/2013
WO WO2010076769 A1 7/2010

OTHER PUBLICATIONS

HTTP Live Streaming Overview Contents, Feb. 11, 2014, XP055143528.
(Continued)

*Primary Examiner* — Ricky Chin
(74) *Attorney, Agent, or Firm* — Maschoff Brennan

(57) ABSTRACT

A method of incorporating additional video objects into source video data to produce output video data. The method includes retrieving source video data and data defining a segment size used by a distributor, into which video data is divided when transmitted. The method includes analyzing the source video data to identify selected frames of video material which include insertion zones which correspond to regions which are suitable for receiving an additional video object. The method includes identifying a boundary point of the source video data. The method includes embedding additional video objects into the selected frames, creating output video data which has a boundary which corresponds with the identified boundary point. The method includes generating metadata including information on said boundary point of the source video data to be replaced by the created output video data; and transmitting the output video data and the metadata to the distributor.

20 Claims, 10 Drawing Sheets

Related U.S. Application Data continuation of application No. 14/678,780, filed on Apr. 3, 2015, now Pat. No. 9,438,936.

(51) Int. Cl.

| | | |
|---|---|---|
| *H04N 21/2343* | (2011.01) | |
| *H04N 21/235* | (2011.01) | |
| *H04N 21/239* | (2011.01) | |
| *H04N 21/2668* | (2011.01) | |
| *H04N 21/81* | (2011.01) | |
| *H04N 21/845* | (2011.01) | |
| *H04N 21/647* | (2011.01) | |
| *H04N 21/262* | (2011.01) | |
| *H04N 21/658* | (2011.01) | |
| *H04N 21/8358* | (2011.01) | |
| *H04N 21/6379* | (2011.01) | |
| *H04N 21/854* | (2011.01) | |

(52) U.S. Cl.
CPC . *H04N 21/23418* (2013.01); *H04N 21/23424* (2013.01); *H04N 21/23439* (2013.01); *H04N 21/234345* (2013.01); *H04N 21/2668* (2013.01); *H04N 21/26258* (2013.01); *H04N 21/6379* (2013.01); *H04N 21/64769* (2013.01); *H04N 21/6582* (2013.01); *H04N 21/812* (2013.01); *H04N 21/8358* (2013.01); *H04N 21/845* (2013.01); *H04N 21/8455* (2013.01); *H04N 21/8456* (2013.01); *H04N 21/854* (2013.01); *H04N 21/858* (2013.01)

(56) References Cited

U.S. PATENT DOCUMENTS

| | | | | |
|---|---|---|---|---|
| 10,237,585 | B2* | 3/2019 | Souche | H04N 21/47205 |
| 10,546,318 | B2* | 1/2020 | Garcia | G06T 3/40 |
| 2003/0149983 | A1* | 8/2003 | Markel | H04N 21/8543 |
| | | | | 725/51 |
| 2004/0233233 | A1* | 11/2004 | Salkind | G06T 7/20 |
| | | | | 715/719 |
| 2005/0088407 | A1* | 4/2005 | Bell | H04N 21/812 |
| | | | | 345/156 |
| 2007/0078713 | A1 | 4/2007 | Ottt, IV et al. | |
| 2007/0204310 | A1 | 8/2007 | Rua et al. | |
| 2007/0299870 | A1 | 12/2007 | Finch | |
| 2008/0010660 | A1 | 1/2008 | Sumiyoshi | |
| 2008/0126226 | A1* | 5/2008 | Popkiewicz | G06Q 30/0601 |
| | | | | 705/26.1 |
| 2008/0256572 | A1* | 10/2008 | Chen | H04N 21/23424 |
| | | | | 725/32 |
| 2008/0262912 | A1 | 10/2008 | Gargi | |
| 2009/0094637 | A1 | 4/2009 | Lemmons | |
| 2009/0222849 | A1 | 9/2009 | Peters | |
| 2009/0292819 | A1* | 11/2009 | Kandekar | H04N 7/17318 |
| | | | | 709/231 |
| 2010/0008647 | A1* | 1/2010 | Isobe | G11B 27/329 |
| | | | | 386/337 |
| 2010/0095303 | A1* | 4/2010 | Archer | G06F 9/505 |
| | | | | 718/105 |
| 2011/0188836 | A1* | 8/2011 | Popkiewicz | G06Q 30/0241 |
| | | | | 386/278 |
| 2012/0143660 | A1 | 6/2012 | Jiwang et al. | |
| 2013/0063561 | A1 | 3/2013 | Stephan | |
| 2013/0064283 | A1 | 3/2013 | Sun et al. | |
| 2013/0132507 | A1* | 5/2013 | Swaminathan | H04N 21/6125 |
| | | | | 709/217 |
| 2013/0136136 | A1* | 5/2013 | Ando | H04L 49/90 |
| | | | | 370/395.1 |
| 2013/0223509 | A1 | 8/2013 | Tweedale et al. | |
| 2014/0082648 | A1* | 3/2014 | Tanner | G06Q 30/0273 |
| | | | | 725/14 |
| 2014/0099081 | A1* | 4/2014 | Cudak | H04N 5/76 |
| | | | | 386/278 |
| 2014/0105576 | A1* | 4/2014 | Lou | H04N 21/4302 |
| | | | | 386/241 |
| 2014/0136728 | A1* | 5/2014 | Xu | H04N 21/816 |
| | | | | 709/231 |
| 2014/0147096 | A1 | 5/2014 | Fauqueur et al. | |
| 2014/0150019 | A1 | 5/2014 | Ma et al. | |
| 2014/0215085 | A1* | 7/2014 | Li | H04L 65/80 |
| | | | | 709/231 |
| 2014/0280386 | A1* | 9/2014 | Mokos | G06F 11/3082 |
| | | | | 707/812 |
| 2014/0281481 | A1* | 9/2014 | Moroney | H04L 63/0457 |
| | | | | 713/151 |
| 2015/0019629 | A1 | 1/2015 | Giladi et al. | |
| 2015/0143416 | A1* | 5/2015 | Onno | H04N 21/44016 |
| | | | | 725/34 |
| 2015/0189401 | A1 | 7/2015 | Yi et al. | |
| 2015/0373394 | A1* | 12/2015 | Marcus | G06Q 30/0242 |
| | | | | 725/32 |
| 2015/0382075 | A1* | 12/2015 | Neumeier | G06F 16/7847 |
| | | | | 725/34 |
| 2016/0117559 | A1* | 4/2016 | Kim | H04N 21/8456 |
| | | | | 386/241 |
| 2016/0117722 | A1* | 4/2016 | Garcia | G06Q 30/0251 |
| | | | | 705/14.49 |
| 2016/0212455 | A1* | 7/2016 | Manna | H04N 21/23424 |
| 2016/0358209 | A1* | 12/2016 | Shiravi Khozani | |
| | | | | G06Q 30/0255 |
| 2017/0026671 | A1* | 1/2017 | Neumeier | H04N 21/4667 |
| 2018/0197575 | A1* | 7/2018 | Doherty | G11B 27/3081 |
| 2019/0052938 | A1* | 2/2019 | Srinivasan | H04N 21/23418 |

OTHER PUBLICATIONS

IIS Smooth Streaming Technical Overview Author: Smooth Streaming Technical Overview, Mar. 1, 2009, XP055178158.

* cited by examiner

Fig. 4

PRODUCING VIDEO DATA

CROSS-REFERENCE TO RELATED APPLICATION

This application is a continuation of U.S. patent application Ser. No. 15/076,323, filed on Mar. 21, 2016, which is a continuation of U.S. patent application Ser. No. 14/678,780, filed Apr. 3, 2015, now U.S. Pat. No. 9,438,936, the disclosures of each of which are hereby incorporated herein by this reference in their entireties.

BACKGROUND OF THE INVENTION

Field of the Invention

This application is a continuation of U.S. patent application Ser. No. 15/185,459, filed on Jun. 17, 2016, which is a continuation-in-part of U.S. patent application Ser. No. 14/939,831, filed Nov. 11, 2015, now U.S. Pat. No. 9,374,536, the disclosures of each of which are hereby incorporated herein by this reference in their entireties.

The present invention relates to producing video data. In particular, but not exclusively, the present invention relates to methods for, and for use in, incorporating one or more additional video objects into source video data to produce output video data, to computer programs, computer program products arranged and systems comprising apparatus adapted for performing such methods.

Description of the Related Technology

The broadcast industry has changed significantly in recent years. With the rise of the internet, digital network based streaming is becoming more popular and gradually replacing traditional television broadcasting. Prior to these changes, television programs were often recorded on video tape, either in a television studio or on location. With videotape there is no file structure; just linear picture information. The availability of digital technologies has resulted in media which are structured with directories and files. The number of processes between raw captured material and the final material is constantly increasing as, in the file-based domain, it is possible to create workflows by concatenating several processes.

With digital file processing, many new processes become possible that can be used to embed a branded product within a scene retrospectively. This may involve digitally post-processing a captured scene to add a representation of, for example, a branded drinks container on a table or shelf.

Adaptive Bitrate Streaming is a method for delivering video to Internet Protocol (IP) devices such as Smartphones, tablets, Connected TVs, laptops etc. In adaptive bitrate streaming, video data is delivered in small segments or chunks (e.g. 2 s). Each segment is encoded into several bitrates, e.g. 400 Kbps, 700 Kbps and 1500 Kbps. Depending on the bandwidth and the capability of the device at any moment, the video data is switched to a higher or lower bitrate for delivering video data to the device. There are different adaptive bitrate formats that are available, HTTP Live Streaming (for Apple® devices), HTTP Dynamic Streaming (by Adobe®), Microsoft Smooth Streaming and Dynamic Adaptive Streaming over HTTP (DASH). Depending on the device requesting the video data, an appropriate video data format is delivered. Since these vary only by format, it is possible to produce or convert video data into different video data formats.

A known system allows for adverts to be placed in between chunks of video material, to replicate the traditional advertising technique of a "mid-roll" or advert break. However, this technique has the disadvantage in that users may skip through the advert and also that the length of the video is extended.

Another known system provides embedded adverts within frames of video material. However, this suffers from the problem that a large amount of video data must be transferred, and targeting adverts at specific users requires that several versions of the embedded video need to be produced and then delivered. The large file size makes delivery of multiple files more time consuming and inefficient. Moreover distributors are not set up to switch embedded adverts when an advert campaign launches and ends. Also, distributors are not set up for gathering analytics on the advert campaign.

It would be desirable to provide improved arrangements for producing video data.

SUMMARY

Embodiments of this invention seek to provide apparatus and methods for providing video material in which one or more additional video objects have been embedded for distribution using adaptive bitrate streaming.

According to one embodiment of the present invention, there is provided method of incorporating one or more additional video objects into source video data to produce output video data, the method including retrieving source video data, the source video data including frames of video material and data defining a segment size used by a distributor, into which video data is divided when transmitted by the distributor; analyzing the source video data to identify selected frames of video material which include one or more insertion zones, wherein the insertion zones correspond to one or more regions within the selected frames of video material which are suitable for receiving an additional video object; identifying at least one boundary point of the source video data, based on the data defining the segment size into which video data is divided prior to distribution, and based on the selected frames; embedding the one or more additional video objects into the selected frames; creating output video data which includes the one or more additional video objects and which has a boundary which corresponds with the identified at least one boundary point; generating metadata including information on said at least one boundary point of the source video data to be replaced by the created output video data; and transmitting the output video data and the metadata to the distributor.

According to another embodiment of the present invention, there is provided a method of incorporating output video data into source video data to produce final video data, the method comprising: providing the source video data, the source video data comprising: frames of video material; and data defining a segment size used by a distributor, into which the output video data is divided when transmitted by the distributor; receiving output video data from a remote location, the output video data including the one or more additional video objects inserted into insertion zones of the source video data, wherein the insertion zones correspond to one or more regions within selected frames of video material which are suitable for receiving an additional video object; receiving metadata from the remote location, the metadata including information on at least one boundary point of the source video data to be replaced by the created output video data, wherein the boundary point is based on the data defining the segment size into which the data is divided prior to distribution, and based on the selected frames; splitting the source video data into source video data segments and placing one or more output video data segments therein based on the received output video data and the received metadata to create the final video data.

According to another embodiment of the present invention, there is provided a method of incorporating one or more additional video objects into source video data to produce output video data, the method comprising: retrieving source video data, the source video data comprising: frames of video material; and data defining a segment size used by a distributor, into which video data is divided when transmitted by the distributor; analyzing the source video data to identify selected frames of video material which include one or more insertion zones, wherein the insertion zones correspond to one or more regions within the selected frames of video material which are suitable for receiving an additional video object; identifying at least one boundary point of the source video data, based on the data defining the segment size into which video data is divided prior to distribution, and based on the selected frames; embedding the one or more additional video objects into the selected frames; creating output video data comprising: the selected frames into which the one or more additional video objects are embedded; and one or more additional frames of video material, which are located between the selected frames and the at least one boundary point, if the selected frames are located within a threshold of the at least one boundary point; generating metadata including information on the source video data to be replaced by the created output video data; and transmitting the output video data and the metadata to the distributor.

According to another embodiment of the present invention, there is provided a system for incorporating one or more additional video objects into source video data to produce output video data, comprising: a memory configured to store retrieved source video data, the source video data comprising: frames of video material; and data defining a segment size used by a distributor, into which video data is divided when transmitted by the distributor; a processor configured to: analyze the source video data to identify selected frames of video material which include one or more insertion zones, wherein the insertion zones correspond to one or more regions within the selected frames of video material which are suitable for receiving an additional video object; identify at least one boundary point of the source video data, based on the data defining the segment size into which video data is divided prior to distribution, and based on the selected frames; embed the one or more additional video objects into the selected frames; create output video data which includes the one or more additional video objects and which has a boundary which corresponds with the identified at least one boundary point; generate metadata including information on said at least one boundary point of the source video data to be replaced by the created output video data; and transmit the output video data and the metadata to the distributor.

According to another embodiment of the present invention, there is provided a system a non-transitory computer-readable medium having computer executable instructions stored thereon, which when executed by a computing device cause the computing device to perform a method of incorporating one or more one or more additional video objects into source video data to produce output video data, comprising retrieving source video data, the source video data comprising: frames of video material; and data defining a segment size used by a distributor, into which video data is divided when transmitted by the distributor; analyzing the source video data to identify selected frames of video material which include one or more insertion zones, wherein the insertion zones correspond to one or more regions within the selected frames of video material which are suitable for receiving an additional video object; identifying at least one boundary point of the source video data, based on the data defining the segment size into which video data is divided prior to distribution, and based on the selected frames; embedding the one or more additional video objects into the selected frames; creating output video data which includes the one or more additional video objects and which has a boundary which corresponds with the identified at least one boundary point; generating metadata including information on said at least one boundary point of the source video data to be replaced by the created output video data; and transmitting the output video data and the metadata to the distributor.

BRIEF DESCRIPTION OF THE DRAWINGS

FIG. 4 illustrates a metadata file in a VMAP format.

DETAILED DESCRIPTION OF CERTAIN INVENTIVE EMBODIMENTS

Figure 1:
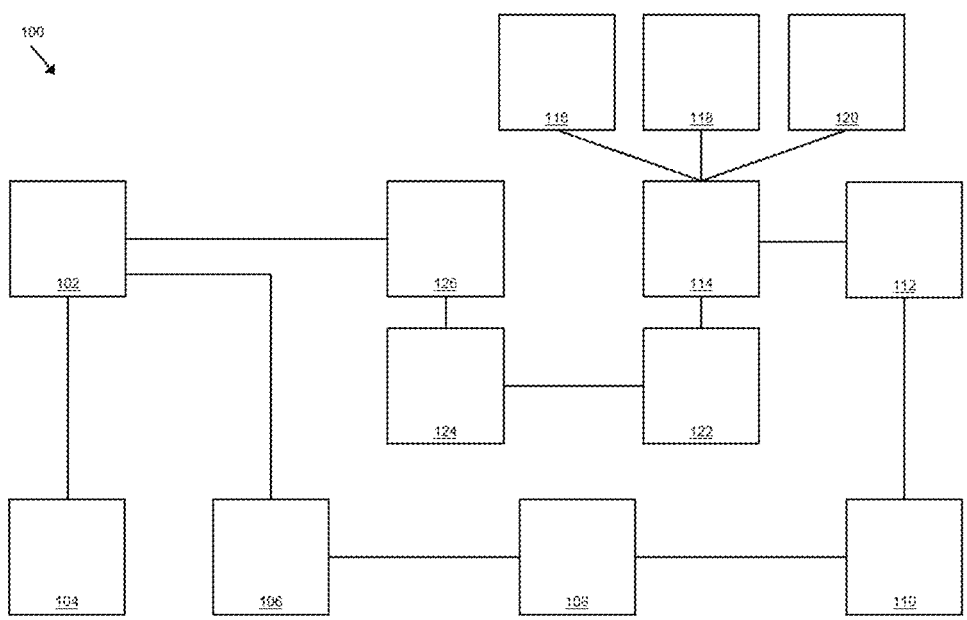
FIG. 1 illustrates a schematic diagram showing a system in accordance with some embodiments.

FIG. 1 is a schematic diagram showing a video processing system 100 in accordance with some embodiments. The subsystems of the video processing system are connected via one or more data communication networks (not shown). In some embodiments, the subsystems are connected to each other via the Internet.

Subsystem 102, which is referred to herein as the "source" hub, performs amongst other things, video data analysis in the video processing system 100. The source hub 102 may retrieve source video data as one or more digital files, supplied, for example, on video or data tape, on digital versatile disc (DVD), over a high-speed computer network, via the network, on one or more removable disc drives or in other ways. In one embodiment, the source video data is provided by a distributor. In another embodiment, the source video data is provided by a content owner 104.

The source video data comprises frames of video material. Contiguous frames of video material set in one location are known as shots.

In some embodiments, the source hub 102 comprises a video data analysis module, which performs pre-analysis in relation to source video data. Such analysis may be performed using appropriate software which allows products to be placed digitally into existing video material.

The pre-analysis may be fully automated in that it does not involve any human intervention.

In some embodiments, the video data analysis module is used to perform a pre-analysis pass in relation to the source video data to identify one or more shots in the source video data. This may involve using shot detection and/or continuity detection which will now be described in more detail.

Pre-analysis may comprise using a video format detection algorithm to identify the format of the source video data, and if necessary, convert the source video data into a format capable of receiving one or more additional video objects.

Pre-analysis may comprise using a shot detection function to identify the boundaries between different shots in video data. For example, the video data analysis module 102a automatically detects "hard" and "soft" cuts between different shots, which correspond to hard and soft transitions respectively. Hard cuts correspond to an abrupt change in visual similarity between two consecutive frames in the video data. Soft cuts correspond to the beginning or the end of a soft transition (for example wipe and cross fading transitions), which is characterized by a significant but gradual change in visual appearance across several frames.

Pre-analysis may comprise using a continuity detection function to identify similar shots (once detected) in video data. This can be used to maximize the likelihood that each (similar) shot in a given scene is identified—this may be a benefit in the context of digital product placement. For each detected shot, a shot similarity algorithm detects automatically visually similar shots within the source video data. The similarity detection is based on matching between frames, which captures an overall global similarity of background and lighting. It may be used to identify shots which are part of a given scene in order to speed up the process of selecting shots that should be grouped together on the basis that they are similar to each other.

Pre-analysis may comprise using an object and/or locale template recognition function and/or a face detection and recognition function. Object template recognition involves identifying objects which reappear across, for example, multiple episodes of a television program, and which are appropriate for digital product placement, so that they can automatically be found in other episodes of the program. Locale template recognition allows a template to be built for a certain locale in a television program and automatically detect the appearance of the locale in subsequent episodes of the program. A locale is a location (e.g. a room) which appears regularly in the program across multiple episodes. Face detection and recognition involve identifying characters which, for example, reappear across multiple episodes of a television programme. This allows for characters to be associated with a particular digital product placement.

Pre-analysis may comprise using a tracking (such as 2D point tracking) function to detect and track multiple point features in video data. This involves using a tracking algorithm to detect and track feature points between consecutive frames. Feature points correspond to locations within an image which are characteristic in visual appearance; in other words they exhibit a strong contrast (such as a dark corner on a bright background). A feature is tracked by finding its location in the next frame by comparing the similarity of its neighboring pixels.

Pre-analysis may comprise using a planar tracking function to follow image regions over time and determine their motion under the assumption that the surface is a plane. This may involve tracking 2D regions defined by splines, calculating their 2D translation, rotation, scale, shear and foreshortening through the video data. This process creates motion information that can be exploited by other video analysis functions.

Pre-analysis may comprise using a motion-from-features detection function which involves using the tracked 2D points to determine 2D motion in the video data. Given a set of tracked feature points, motion-from-features detection involves detecting which points move together according to the same rigid motion.

Pre-analysis may comprise using a 3D tracking function which involves using the tracked 2D points to determine 3D motion in the video data. 3D tracking involves extracting geometric information from a video shot, for example the camera focal distance, position and orientation as it moved. The other information recovered is the 3D shape of the viewed scene, represented as 3D points.

Pre-analysis may comprise using an autokeying function to separate background and foreground areas, allowing products to be digitally placed while respecting any occluding (foreground) objects to provide a natural-looking embedded image. When a foreground object moves in front of the background where it is desired to place a product digitally, the area into which the product is to be placed should stop at the boundary between the foreground and background areas. In general, the digitally placed product should cover the "mask" area of the background data. The correct mask can be especially difficult to create when the edge of the foreground object is very detailed or blurred. The autokey algorithm uses the planar tracker to create motion information so that known background or foreground areas can be propagated forwards and backwards through the video in time.

Pre-analysis may comprise region segmentation which is used to split the video data into regions that span both time and space. Region segmentation involves using an algorithm that detects regions of similar pixels within and across frames of a given video scene, for example to select point features for motion estimation.

Pre-analysis may comprise using a black border detection function, which is used to find the borders around the video image part of video data. This involves using an algorithm that detects the presence of black bars around the frames in a video sequence, which can interfere with various video processing algorithms.

Pre-analysis may comprise proxy creation, which involves creating a lower resolution and/or compressed version of the source video data.

The source hub analyses the source video data to find regions within the source video data which are suitable for receiving one or more additional video components. The regions within the source video data which are suitable for receiving additional video data are known as insertion zones.

In one embodiment, the source hub 102, is also used for creative work in the video processing system 100.

The source hub 102 is provided with the modules, such as a tracking module which may be used to determine how the position of a digitally placed product should vary when added into video material, for example to take into account any movement of the camera that recorded the video material. Tracking may be automated and/or may involve human intervention.

The source hub 102 also comprises a masking module. The masking module is used to assess how to handle occlusion (if any) of a product to be digitally placed in video material having regard to other objects that may already be present in the video material. Masking assessment may be automated and/or may involve human intervention.

The source hub 102 also comprises an appearance modelling module. The appearance modelling module is used to provide a desired appearance in relation to the digitally placed product, for example using blur, grain, highlight, 3D lighting and other effects. Appearance modelling may be automated and/or may involve human intervention.

Subsystem 106 represents a data store which is suitable for storing video data.

Subsystem 108 represents an encoder for encoding video into one or more bitrates. The encoder 108 is capable of receiving video data from the source hub 102, compressing the video and converting the video data into one or more formats.

Subsystems 110 and 112 represent an origin server and content delivery network (CDN) respectively. CDN allow data to be transmitted more efficiently over the internet and are well known in the art.

Subsystem 114, which is referred to as the "distributor", performs amongst other things, video distribution. An example of a distributor is YOUTUBE®. The distributor allows access to video files to users through the network.

Subsystems 122, 124 and 126 represent a stream manager, Ad decision system and Ad policy manager respectively and are described in more detail below.

Traditional video streaming techniques such as Real-Time Streaming Protocol (RTP) and Windows Media HTTP Streaming Protocol (MS-WMSP) involved a server sending a steady stream of data packets, encoded at a uniform bitrate, to a client, such as 116, 118 or 120. The server sends the data packets to the client only at the bitrate at which the video is encoded. For example, if a source video is encoded at 500 kbps, then the video will be streamed at 500 kbps. Further, the server only sends enough data packets to fill the client buffer. The client buffer is typically between 1 and 10 seconds. This means that even if a user pauses a streaming video, only between 1 and 10 second of video material is downloaded at the client.

Progressive download advanced traditional streaming techniques by allowing streamed video to be played at the client before the whole video file has been downloaded. Progressive download is supported by most media players and platforms and operates based on a simple download form a HTTP Web Server. Unlike traditional streaming, is a video is paused, the remainder of the video will continue to download to the client.

Figure 2:
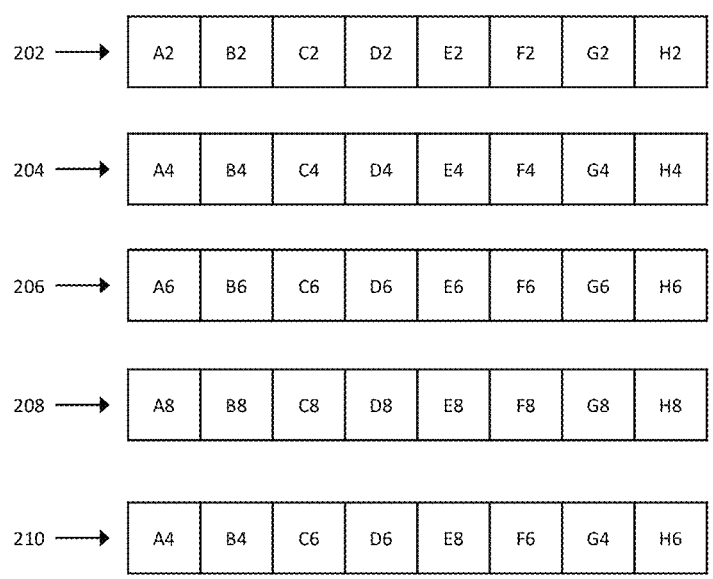
FIG. 2 illustrates an example of adaptive bitrate streaming.

FIG. 2 illustrates adaptive bitrate streaming. Adaptive bitrate streaming works by splitting video data 202 into many "chunks" or "segments", such as A2, B2, C2, etc. The segments are uniform and are typically between 2 s and 10 s long. The exception to the rule regarding uniform segments is that the last segment size may not correspond to the size of other segments. Alternatively, the segment size may be defined in terms of the number of frames of video material. In one embodiment, the segment size may be between 50 and 250 frames. The segment size is determined by a distributor, and varies depending on the distributors delivery platform and the type of content (live, VoD etc.). The distributor provides data to the source hub defining a segment size used by the distributor into which final video data is divided before transmission.

Each segment is encoded into at least two bitrates by an encoder. In FIG. 2, the video data is encoded into three bitrates represented by 204, 206 and 208. In some embodiments, each segment is encoded into between 3 and 14 different bitrates of different quality. In one embodiment, each segment is encoded into three bitrates: 400 Kbps, 700 Kbps and 1500 Kbps.

The client can now choose between segments encoded at different bitrates depending on the available network capacity for the client. If the client has a high bandwidth capacity then the segments encoded at a high bitrate are selected and the video data is streamed at a higher quality. If the network bandwidth is reduced, then the client can select a lower bitrate segment. As with progressive download, the video data will continue to download if the user pauses a video. In the example of FIG. 2, the first two segments are selected from the encoded video data 204. The next segment is selected from the encoded video data 206 etc.

Each segment begins with an Instantaneous Decoder Refresh (IDR) frame. The DR frame is utilized as a reference frame for the other video frames in the segment. As the remaining frames in the segment reference the DR frame, compression techniques may be employed to compress the segment video data. Subsequent frames can be decoded using the DR frame and does not need any other information prior to that. The remaining frames in a segment would not be played if the DR frame is missing. In one embodiment, the segment size corresponds to the DR frame interval.

Adaptive bitrate streaming allows the client to download the video data at a rate suitable to the current network conditions and therefore it reduces the risk that there will not be sufficient video segments in the client buffer to continue playing the video. Adaptive bitrate streaming provides a platform for inserting output video data, which includes one or more additional video objects, such as advertising components, within the source video data to produce final video data.

Figure 3:
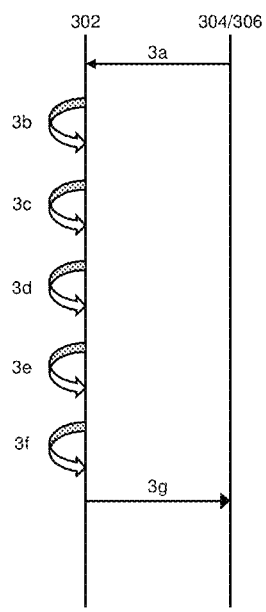
FIG. 3 illustrates a sequence timing diagram showing the flow of messages associated with adding one or more additional video objects into source video data to produce output video data in accordance with some embodiments.

FIG. 3 shows a sequence timing diagram showing the flow of messages associated with adding one or more additional video objects into source video data to produce output video data in accordance with some embodiments.

In step 3a, the source hub 302 retrieves source video data. In one embodiment in the source video data is retrieved from the distributor. In one embodiment, the source video data is retrieved from the content producer 304. The source video data includes frames of video material along with data defining a segment size used by the distributor in which video data is divided prior to distribution. The segment size may be defined in either time period or number of frames. In one embodiment the source video data comprises information on a minimum permitted length of insertion zone. If the insertion zone is below the minimum permitted length, then additional video objects will not be embedded within the source video data. The source video data further comprises information on As step 3b, the source hub 302 analyses the video material to identify "insertion zones" or regions within the source video data which are suitable for receiving one or more additional video objects.

In one embodiment, following an identification of an insertion zone in a shot of source video material, the remainder of the source video material is analyzed to identify if the insertion zone appears in one or more shots in the source video material. Frames in which the insertion zones are identified are known as selected frames.

In step 3c, the source hub 302 calculates a location of at least one boundary point, based on the data defining the segment size into which video data is divided prior to distribution, and based on the selected frames. The boundary point corresponds to a start point of a segment in the final video data produced by the distributor prior to distribution. The boundary point represents the earliest boundary of a segment in which the selected frame will occur in the final video data. In one embodiment, the boundary point comprises an DR frame. In one embodiment the source video data comprises data on the frame rate of the source video data. In one embodiment, the source hub provides the output video data at a different frame rate compared with the source video data. Therefore, the source hub needs to incorporate the difference between the frame rates into the step of identifying the boundary point and the provision of the output video data.

In an example, the selected frames in which insertion zones have been identified, occur between 8.5 s and 9.5 s from the start of the source video data, and the distributor provides information that the segment size is 2 s, then the source hub 302 calculates that the boundary point will, in this example, occur at 8 s.

In an example, the selected frames occurring between 9.5 s and 10.5 s, and the segment size is 2 s, then again, the boundary point will occur at 8 s.

The boundary point is calculated to ensure that the output video data produced by the source hub 302 adhered to the requirements of the distributor, such as their adaptive bitrate streaming settings. As there is an IDR frame at each boundary point, it is important to replace a whole segment of final video data, rather than a portion of the segment. By calculating a boundary point of the segment, the source hub 302 can calculate how many more frames, in addition to the selected frames, need to be included in the output video data, such that the provided output video data corresponds to a multiple of the segment size. Replacing a whole segment, rather than a portion of the segment means that it is easier for the output video data to be included into the source video data by the distributor. In one embodiment, two boundary points are identified for each segment of source video data, the first corresponds to the first frame of the segment and comprises an DR frame, the second boundary point corresponds to the last frame of the segment, which is located one frame prior to the next DR frame.

In step 3d, the one or more additional video objects are embedded into the selected frames. In one embodiment, the embedding of one or more additional objects into the source video data is carried out at the source hub 302 itself. In an alternative embodiment, the source video data and the one or more additional video objects are provided to one or more remote hubs, such as a creative hub, to perform this embedding. Providing a hub in a remote location allows resources to be more efficiently distributed, for example, by locating the remote hub near a larger pool of labor.

In step 3e, output video data is created. The output video data comprises one or more output video data segments. The output video data may include one or more frames which are not selected frames. The reason for this is that it is important that the boundary of the output video data corresponds to a boundary of the final video data which will be segmented prior to distribution by the distributor. In the example described above, in which a collection of selected frames in which an insertion zones are present are located between 8.5 s to 9.5 s, and the segment size is 2 s, the boundary point will occur at 8 s. To ensure that the output video data has a boundary which corresponds to the boundary point, video frames which occur between 8 s and 8.5 s will also be included in the output video data, even though in this example, they do not include an insertion zone.

In the second example described above, in which the insertion zones are present in frames occurring between 9.5 s and 10.5 s, the relevant boundary point will also be 8 s. The reason that the boundary point is 8 s rather than 10 s is that a portion of the output video data will occur in the segment between 8 s and 10 s, that portion will be encoded relative to the DR frame occurring at 8 s. In this example, the video frames between 8 s and 9.5 s will also be included in the output video data. In addition, the frames between the end of the selected frames to the next boundary point will also be included, which in this example, is the frames between 10.5 s and 12 s. In one embodiment, the size of the output video data corresponds to the size of segment as provided by the distributor. In another embodiment the output video date corresponds to a multiple of the size of the segment as provided by the distributor.

Since the output video data is much smaller in duration compared to the source video data, file sizes of output video data is much smaller and hence the transmission of the output video data easier compared with transmitting the source video data.

In step 3f, metadata is created which provides information on the at least one boundary point of the source video data to be replaced by the output video data. The metadata comprises timing information, including the timing of the boundary point. In one embodiment the metadata comprises timing information on the length of time of the output video data. In one embodiment, the metadata includes information on the number of frames of output video data.

In one embodiment, the metadata includes data on a tracking pixel. The tracking pixel can be configured to transmit a message as a result of the output video data being played. There tracking pixel could be placed at the start of the output video data, or at any point throughout the course of the output video data. The tracking pixel enables data to be gathered on the number of times that a particular advert, in output video data, has been played, which can be utilized for billing purposes. If more than one tracking pixel is included in the metadata, the tracking pixel configured to fire at the start, middle and end of the output video data, then data can be collected on the number of times the start, the middle and end of the output video data.

In one embodiment the metadata is in a Video Multiple Ad Playlist (VMAP) format. VMAP is a standard from the Interactive Advertising Bureau (IAB). VMAP is in XML format that is typically used to describe the structure of advert inventory insertion, for traditional pre-roll and mid-roll advertisements. A pre-roll advertisement is a collection of video frames, which are not derived from the source video data, which are configured to play before the final video data is provided to a user. A mid-roll advertisement is similar to a pre-roll advertisement, but wherein the advertisement is played in between a break in frames of the final video data.

The VMAP file is used by companies such as Double-Click™, Google® and Adobe®. VMAP is used in conjunction with another standard called Video Ad Serving Template (VAST). VAST is another XML based standard used for serving adverts to online digital video players. A VMAP file is used in conjunction with the VAST standard.

Figure 4:
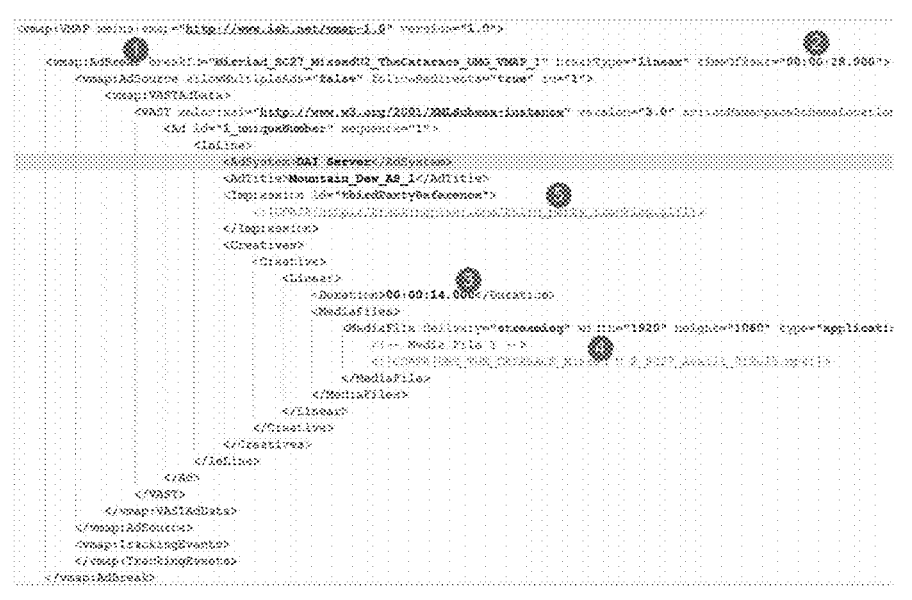

As these standards are established in the industry, they can be utilized to provide advertisements to a wide audience. The metadata will not be used exactly the same way as a VMAP file would be used to specify mid-rolls and pre-rolls information as the output video data will not be used in the same way as traditional pre-roll or mid-rolls. FIG. 4 shows an example of a metadata file in a VMAP format.

Marker 1 in FIG. 4 shows information on the output video data that is to be inserted into the source video data. The metadata provides information about the output video data and data of the additional video data which is embedded in the output video data. The metadata may provide information on the location of the output video data, such as a URL address.

Marker 2 in FIG. 4 shows information the time code to insert the output video data into the source video data. Marker 3 in FIG. 4 shows information the duration of the output video data. For example if the output video data duration is 14 section, and the standard segment size used by the distributor is 2 seconds, then the output video data will consist of 7 segments. Marker 4 in FIG. 4 shows information on the output video data video file. Marker 5 in FIG. 4 shows information on a firing pixel that fires when a specified instant within the output video data is reached. These instances could be the start of the output video data, 1 second into the output video data or the end of the output video data. In one embodiment, metadata data is provided to a Stream Manager. The Stream Manager may manage the playlist and streams of the client. In another embodiment, since the metadata is in the VMAP format, the metadata is used directly by the player.

In step 3g, the output video data and the metadata are transmitted to the distributor.

Figure 5:
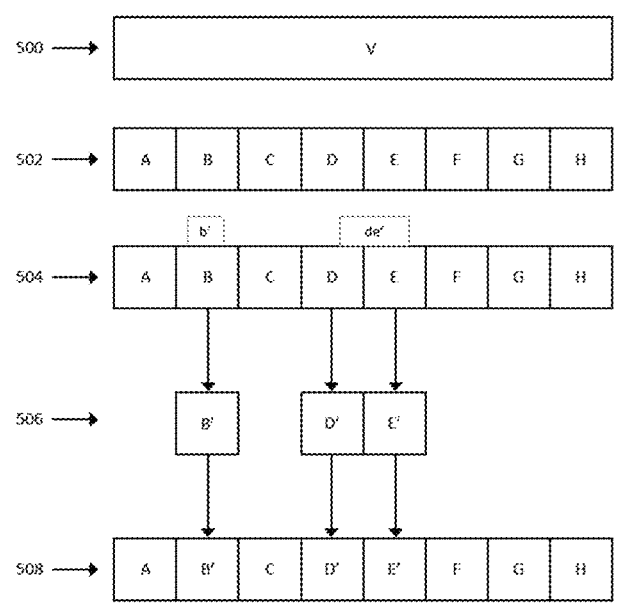
FIG. 5 illustrates a sequence diagram for inserting output video data into source video data in accordance with some embodiments.

FIG. 5 shows a sequence diagram for inserting output video data into source video data. In S500, source video data is retrieved. In S502, boundary points are identified within the source video data, based on the data of the segment size provided by the distributor. The boundary points represent the segments into which the video data will be divided prior to distribution, based on data of the segment size provided by the distributor. The source video data is not necessarily divided at this stage.

In S504, the source hub analyses the source video data to identify one or more insertion zones in the source video data. Selected frames in which the one or more insertion zones are identified are represented by b' and de'. Selected frames b' correspond with segment B, therefore the boundary point occurs at the boundary between segments A and B. Selected frames de' correspond with segments D and E, therefore the boundary point occurs at the boundary between segments C and D.

In S506, the additional video data is embedded within the selected frames and output video data is created which includes the one or more additional video objects. The boundaries of the output video data correspond with a boundary of the identified at least one boundary point. In S506, the segment B' includes the one or more selected frames in which the additional video objects have been embedded, and also includes one or more frames in which additional video objects have not been added. The size of the segment B' corresponds to the size of segment B, which will be replaced by B' in the final video data. By matching the size of the segment B' with B, the process of replacing the segment is made easier.

Segment D' and E' includes the one or more selected frames in which the additional video objects have been embedded, and also includes one or more frames in which additional video objects have not been added. The size of the segments D' and E' corresponds to the size of segment D and E, which will be replaced by D' and E' in the final video data.

S508 shows the final video data showing segments of the output video data, B', D' and E' replacing segments of the source vide data, B, D and E. Information on where the segments of the output video data which includes B', D' and E' is transmitted to the distributor in the metadata.

Before distribution of the final video data shown in S508, the final video data is split into the segments at the distributor. The segments are encoded into multiple bitrates and delivered to the client using adaptive bitrate streaming techniques.

Figure 6:
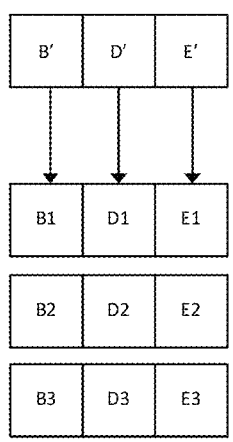
FIG. 6 illustrates a diagram that illustrates a method for incorporating one or more additional video objects into source video data to produce output video data in accordance with some embodiments.

In one embodiment, the output video data is divided into segments and encoded at the source hub. Each segment is encoded into multiple bitrates at the source hub as shown in FIG. 6. FIG. 6 shows segment B', D' and E' each being encoded into a first version of the output video data into a first bitrate, represented by B1, D1 and E1. FIG. 6 also shows the output video data being encoded into one into one or more bitrates, represented by B2, D2 and E2 and B3, D3 and E3. The encoded output video data is provided to the distributor and the distributor can insert the segments within the source video data based on the corresponding metadata.

Figure 7:
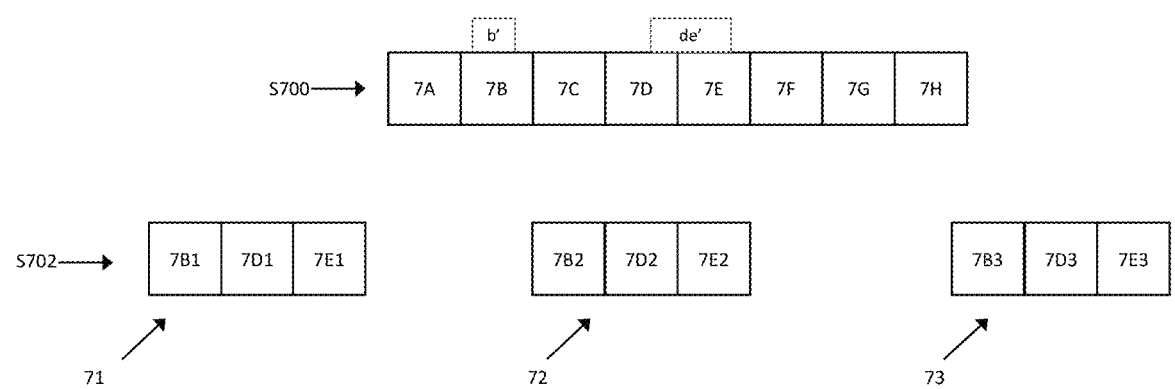
FIG. 7 illustrates multiple versions of the output video data in accordance with some embodiments.

Targeted advertising involves providing different advertising components to different users depending on characteristics of the user. FIG. 7 shows an example of multiple versions of the output video data being created in accordance with some embodiments, the one or more additional versions of the output video data comprising one or more additional video objects which are different to the one or more additional objects which are inserted into other versions of the output video data. Step S700 corresponds to step S504 shown in FIG. 5, in which insertion zones b' and de' have been identified in the source video data.

In step 702, three versions of the output video are created 71, 72 and 73. In output video data 71, a first advertising component corresponding to a first set of additional video data is inserted to produce a first version of the output video data. In output video data 72, a second advertising component corresponding to a second set of additional video data is inserted to produce a second version of the output video data. In output video data 73, a third advertising component corresponding to a third set of additional video data is inserted to produce a third version of the output video data. The three versions of the output video data are transmitted to the distributor.

The method described above and shown in FIG. 7 enables output video data with several product variations to be created. For example, if there are 3 variations of additional video data to be embedded into source video data to create output video data 6 s long, within source video data of 22 minutes, the sum of the length of the four output video data is still 6*3=18 s, compared with 1320 seconds for the source video data. It is conceivable that there are different brands placed in the same content to be delivered to different demographics, locations or users.

In embodiments, the distributor comprises an Ad policy manager, an Ad delivery system and a stream manager. The Ad Policy Manager sets general rules as to when to deliver each variation, for example, an affluent area may be targeted with adverts for high-end cars. The Ad delivery system analyses the characteristics of a profile of a user to determine which rules set by the Ad policy manager apply. The stream manager operates in conjunction with user's client device and provides a manifest file to the client device, which dictates the contents to be provided to the client device.

Figure 8:
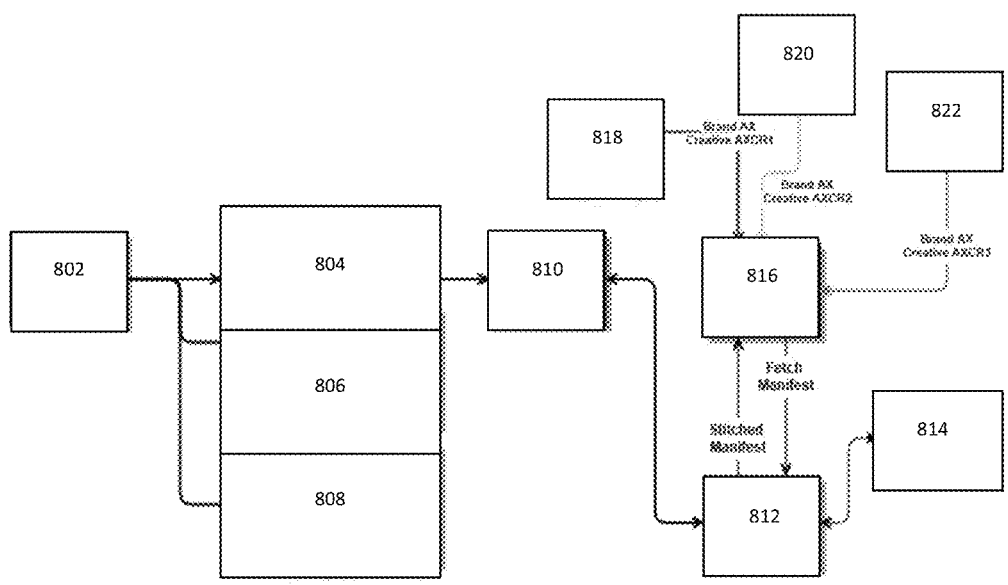
FIG. 8 illustrates a targeting process in accordance with some embodiments.

FIG. 8 illustrates a targeting process in accordance with some embodiments. The source hub 802 creates three versions of output video data 804, 806 and 808. Output video data 804 comprises a first one or more additional video objects. Output video data 806 comprises a second one or more additional video objects. Output video data 808 comprises a third one or more additional video objects. The three versions of the output video data, 804, 806 and 808 are encoded and cached by the distributor. When a user 818 requests video content from the distributor player 816, the player requests a manifest file from the Stream Manager 812. The Stream Manager contacts the Ad Decision System 814 which then analyzes the profile of the user 818 and selects a targeted advert, based on the rules set by the Ad Policy Manager 810, which has access to the output video data 804, 806, 808. The corresponding encoded output video data in which the selected advert is embedded is then added to the manifest file. The Stitched Manifest file is then sent to the player which then seamlessly plays the output video data comprising the selected advert as part of the final video data. The Ad Decision System may select a different advert for each user 818, 820, 822.

Targeted advertising satisfying specific geographies, specific devices, or specific viewers. In one embodiment, a different version of the output video data will exist for each targeted version in a single advertising campaign. These versions will differ in the advertising content embedded within the output video data. For example output video data version 1 could include a Salsa flavor for a product and output video data version 2 could include a Quezo flavor for a product. Which version of the output video data is provided for a viewer is decided by the Ad Decisioning System.

Figure 9:
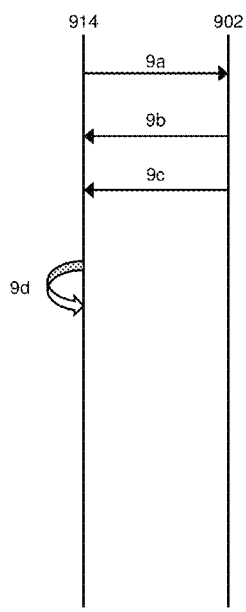
FIG. 9 illustrates a sequence timing diagram showing the flow of messages associated with placing output video data into source video data to produce final video data in accordance with some embodiments.

FIG. 9 shows a sequence timing diagram showing the flow of messages associated with placing output video data into source video data to produce final video data in accordance with some embodiments.

In step 9a, source video data comprising frames of video material and data defining a segment size used by a distributor is provided to the source hub. The source video data may be created by one or more content producers and provided to the distributor. The source video data comprises frames of video material and data defining a segment size used by a distributor, into which the output video data is divided when transmitted by the distributor. As described above, the source video data is divided into segments prior to distribution for use with adaptive bitrate streaming.

In step 9b, the distributor receives output video data from a remote location, such as a source hub, the output video data including the one or more additional video objects inserted into insertion zones of the source video data, wherein the insertion zones correspond to one or more regions within selected frames of video material which are suitable for receiving an additional video object. In one embodiment, the additional video object is an advertising component. The output video data may also include one or more frames of video material in which an additional video object has not been included, the reason for including one or more frames of video material in which additional video objects are not included is to extend the boundary of the output video data to correspond with one or more boundary points of segments into which data is divided prior to distribution.

In step 9c, the distributor receives metadata from the remote location, the metadata including information on at least one boundary point of the source video data to be replaced by the created output video data. The metadata comprises timing information, including the timing of the boundary point. In one embodiment the metadata comprises timing information on the length of time of the output video data. In one embodiment, the metadata included information on the number of frames of output video data.

In one embodiment, the metadata include data on a tracking pixel. The tracking pixel can be configured to transmit a message as a result of the output video data being played. There tracking pixel could be placed at the start of the output video data, or at any point throughout the course of the output video data. The tracking pixel enables data to be gathered on the number of times that a particular advert has been played. If more than one tracking pixel is included in the metadata, the tracking pixel configured to fire at the start, middle and end of the output video data, then data can be collected on the number of times the start, the middle and end of the output video data. In one embodiment the metadata is in a Video Multiple Ad Playlist (VMAP) format.

The boundary point is based on the data defining the segment size into which the data is divided prior to distribution, and based on the selected frames.

In step 9d, the source video data is split into source video data segments. The size of the source video data segments corresponds to the data on the provided size of the segments provided to the remote location. The one or more output video data segments are paced into the source video data segments therein based on the received output video data and the received metadata to create the final video data.

In one embodiment, segments of the final video data are encoded into a first version of the final video data at a first bitrate; and one or more additional versions of the segments of the final video data are encoded into one or more additional bitrates. In some embodiments, each segment is encoded into between 3 and 14 different bitrates of different quality. In one embodiment, each segment is encoded into three bitrates: 400 Kbps, 700 Kbps and 1500 Kbps.

The client can now choose segments encoded at different bitrates depending on the available network capacity for the client. If the client has a high bandwidth capacity then the segments encoded at a high bitrate are selected and the video data is streamed at a higher quality. If the network bandwidth is reduced, then the client can select a lower bitrate segment.

In one embodiment, multiple versions of the output video data are created. A first advertising component corresponding to a first set of additional video data is inserted to produce a first version of the output video data. A second advertising component corresponding to a second set of additional video data is inserted to produce a second version of the output video data. A third advertising component corresponding to a third set of additional video data is inserted to produce a third version of the output video data. There may be more than three versions of the output video data created. In embodiments, the Ad Decision System analyzes the profile of a user and selects a targeted advert, based on the rules set by the Ad Policy Manager. The corresponding encoded output video data in which the selected advert is embedded is then added to the manifest file. The Stitched Manifest file is then sent to the player which then seamlessly plays the output video data comprising the selected advert as part of the final video data. The Ad Decision System may select a different advert for each user.

Targeted advertising satisfying specific geographies, specific devices, or specific viewers. In one embodiment, a different version of the output video data will exist for each targeted version in a single advertising campaign. These versions will differ in the advertising content embedded within the output video data. For example output video data version 1 could include a Salsa flavor for a product and output video data version 2 could include a Quezo flavor for a product. Which version of the output video data is provided for a viewer is decided by the Ad Decisioning System.

Figure 10:
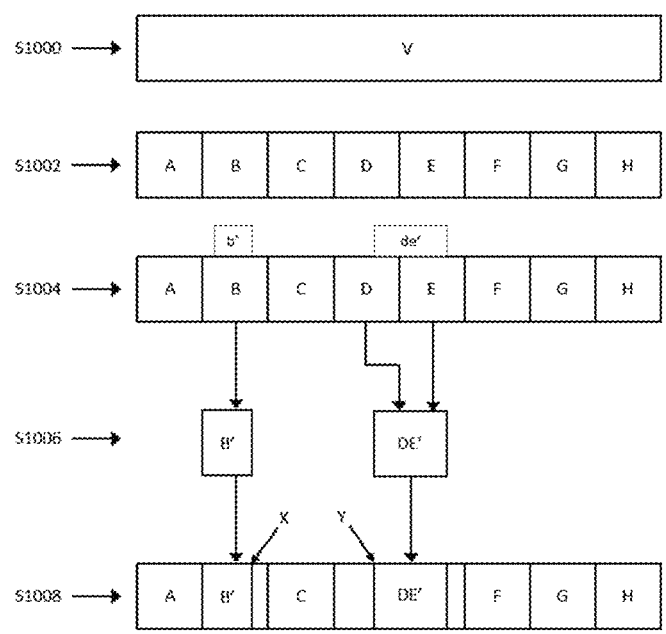
FIG. 10 illustrates a sequence diagram for inserting output video data into source video data in accordance with some embodiments.

FIG. 10 illustrates a sequence diagram for inserting output video data into source video data in accordance with some embodiments. Steps S1000, S1002 and S1004 correspond to steps S500, S502 and S504. In S1000, source video data is retrieved. In S1002, boundary points are identified within the source video data, based on the data of the segment size provided by the distributor. The boundary points represent the segments into which the video data will be divided prior to distribution, based on data of the segment size provided by the distributor. The source video data is not necessarily divided at this stage.

In S1004, the source hub analyses the source video data to identify one or more insertion zones in the source video data. Selected frames in which the one or more insertion zones are identified are represented by b' and de'. Selected frames b' correspond with segment B, therefore the boundary point occurs at the boundary between segments A and B. Selected framesde' correspond with segments D and E, therefore the boundary point occurs at the boundary between segments C and D.

In S1006, the additional video data is embedded within the selected frames and output video data is created which includes the one or more additional video objects. However, in contrast to S506, the boundaries of the output video data do not necessarily correspond with a boundary of the identified at least one boundary point. Rather, a boundary of an output video data segment will be extended if the selected frames have a predetermined proximity relationship with the at least one boundary point. The boundary of the output video data can be adjusted by including one or more additional frames into the output video data segment which do not include one or more additional objects. One or more additional frames which do not include one or more additional objects will be included in the output data segments if the selected frames have a predetermined proximity relationship with the at least one boundary point. In one embodiment, the predetermined proximal relationship is based on a number of frames. In one embodiment, one or more additional frames which do not include one or more additional objects will be included in the output data segments if the selected frames are within 100 frames of the boundary point. In one embodiment, one or more additional frames which do not include one or more additional objects will be included in the output data segments if the selected frames are within 10 frames of the boundary point.

In one embodiment, the predetermined proximal relationship is based on a period of time. In one embodiment, one or more additional frames which do not include one or more additional objects will be included in the output data segments if the selected frames are within 0.5 seconds of the boundary point. In one embodiment, one or more additional frames which do not include one or more additional objects will be included in the output data segments if the selected frames are within 0.1 seconds of the boundary point.

In the example of S1006, output video data segment DE' is not within the predetermined proximity relationship with the at least one boundary point, and therefore one or more additional video frames are not included and the output video data segment DE' is not extended to a boundary. Output video data segment B' is within the predetermined proximity relationship with the at least one boundary point, in this case the boundary between A and B. Therefore, one or more additional frames one or more additional frames which do not include one or more additional objects will be included in the output data segment B'.

As with S506 information on where the segments of the output video data which includes B', D' and E' is transmitted to the distributor in the metadata.

S1008 shows the final video data showing segments of the output video data, B', D' and E' replacing segments of the source vide data, B, D and E. Information on where the segments of the output video data which includes B', D' and E' is transmitted to the distributor in the metadata.

In this embodiment, as the whole of the segment is not being replaced, one or more additional IDR frames are created and inserted in front of each newly created segments. An example of where the new IDR frames are required is represented by X and Y in the FIG. 10. The new IDR frames are created by the distributor.

The invention claimed is:

1. A method of incorporating a video object into a source video, the method comprising:
   receiving source video data that includes a plurality of frames of video material;
   receiving data defining a uniform segment size of a plurality of segments into which at least a portion of the video material is to be divided when transmitted by a distributor, the segment size having a uniform duration associated therewith such that each segment of the plurality of segments has a same duration;
   identifying, by analyzing the source video data, an insertion zone within image content of the video material that is suitable for receiving a video object;
   identifying selected frames of the plurality of frames of the video material that include the insertion zone in response to the selected frames including the insertion zone, the selected frames being sequential with respect to each other and having a starting frame and an ending frame, the starting frame being included in a first particular segment of the plurality of segments and the ending frame being included in a second particular segment of the plurality of segments, the second particular segment being the same segment as or a different segment from the first particular segment;
   determining a first point in time of the video material that the starting frame of the selected frames occurs;
   identifying, based on a first relationship between the duration of the segment size- and the determined first point in time, a first boundary point of the source video data that occurs at a multiple of the duration of the segment size, the first boundary point occurring before the first point in time and corresponding to an earliest frame of the first particular segment;
   determining a second point in time of the video material that the ending frame of the selected frames occurs;
   identifying, based on a second relationship between the duration of the segment size and the determined second point in time, a second boundary point of the source video data that occurs after the second point in time and that corresponds to a latest frame of the second particular segment, the plurality of frames including a sub-set of frames that is a sequence of frames that starts at the earliest frame of the first particular segment and ends at the latest frame of the second particular segment such that the first boundary point and the second boundary point define the sub-set of frames in a manner that the sub-set of frames includes the selected frames and each segment included in the sub-set of frames is included as a whole segment having the segment size;

embedding, based on the identified insertion zone, a video object within the insertion zone of the image content of each respective selected frame such that the video object appears as part of the image content of each of the selected video frames; and creating output video data based on the sub-set of frames in response to the sub-set of frames including the plurality of selected frames and in response to each segment included the sub-set of frames being included as a whole segment, the output video data including metadata and only a modified sub-set of frames of the plurality of frames, the modified sub-set of frames being the sequence of frames that starts at the earliest frame of the first particular segment and ends at the latest frame of the second particular segment such that the modified sub-set of frames includes the plurality of selected frames with the video object embedded therein and such that each segment included in the modified sub-set of frames is included as a whole segment.

2. The method of claim 1, wherein the data defining the segment size defines the segment size by one or more of: a time duration and the particular number of frames.

3. The method of claim 1, wherein the metadata includes one or more of the following:
   timing information related to one or more of occurrence of the first boundary point and occurrence of the second boundary point;
   timing information related to a duration of presentation of the modified sub-set of frames; and
   a number of frames of the modified sub-set of frames.

4. The method of claim 1, wherein the output video data includes a tracking pixel configured to transmit a message as a result of the modified sub-set of frames being presented.

5. One or more non-transitory computer-readable media having computer executable instructions stored thereon, which in response to being executed by a computing system cause the computing system to perform the method according to claim 1.

6. A method of incorporating a video object into a source video, the method comprising:
   receiving source video data that includes a plurality of frames of video material;
   receiving data defining a uniform segment size of a plurality of segments into which at least a portion of the video material is to be divided when transmitted by a distributor, the segment size having a uniform duration associated therewith such that each segment of the plurality of segments has a same duration;
   identifying, by analyzing the source video data, an insertion zone within image content of the video material that is suitable for receiving a video object;
   identifying selected frames of the plurality of frames of the video material that include the insertion zone in response to the selected frames including the insertion zone, the selected frames being sequential with respect to each other and having a starting frame included in a first particular segment of the plurality of segments;
   identifying, based on a relationship between the duration of the segment size and occurrence of the starting frame, a first boundary point of the source video data that occurs at a multiple of the duration of the segment size, the first boundary point occurring before the starting frame and corresponding to an earliest frame of the first particular segment; the plurality of frames including a sub-set of frames that is a sequence of frames that starts at the earliest frame such that the first boundary point defines the sub-set of frames in a manner that the sub-set of frames includes the selected frames and the sub-set of frames includes the first particular segment as a whole segment having the segment size;
   embedding, based on the identified insertion zone, a video object within the insertion zone of the image content of each respective selected frame such that the video object appears as part of the image content of each of the selected video frames; and
   creating output video data based on the sub-set of frames in response to the sub-set of frames including the plurality of selected frames and in response to the sub-set of frames including the first particular segment as a whole segment, the output video data including fewer frames than all of the plurality of frames in which the fewer frames include a modified sub-set of frames of the plurality of frames, the modified sub-set of frames being the sequence of frames that starts at the earliest frame of the first particular segment and including the plurality of selected frames with the video object embedded therein.

7. The method of claim 6, further comprising determining a first point in time of the video material that the starting frame of the selected frames occurs, wherein identifying the first boundary point based on the segment size and the starting frame includes identifying the first boundary point based on the first point in time and the segment size.

8. The method of claim 6, wherein the selected frames include an ending frame included in a second particular segment of the plurality of segments and wherein the method further comprises:
   identifying, based on the duration of the segment size and based on occurrence of the ending frame, a second boundary point of the source video data that corresponds to a latest frame of the second particular segment, wherein the sub-set of frames ends at the latest frame of the second particular segment such that the first boundary point and the second boundary point define the sub-set of frames in a manner that the sub-set of frames includes the selected frames and each segment included in the sub-set of frames is included as a whole segment and wherein the modified sub-set of frames ends at the latest frame of the second particular segment such that each segment included in the modified sub-set of frames is included as a whole segment.

9. The method of claim 8, further comprising:
   determining a first point in time of the video material that the starting frame of the selected frames occurs, wherein identifying the first boundary point based on the segment size and the starting frame includes identifying the first boundary point based on the first point in time and the segment size; and
   determining a second point in time of the video material that the ending frame of the selected frames occurs, wherein identifying the second boundary point based on the duration of the segment size and the ending frame includes identifying the second boundary point based on the second point in time and the segment size, wherein the second particular segment is the same segment as or a different segment from the first particular segment.

10. The method of claim 6, wherein the output video data includes metadata that includes one or more of the following:
   timing information related to occurrence of the first boundary point;

timing information related to a duration of presentation of the modified sub-set of frames; and a number of frames of the modified sub-set of frames.

11. The method of claim 6, wherein the output video data includes a tracking pixel configured to transmit a message as a result of the modified sub-set of frames being presented.

12. The method of claim 6, wherein the data defining the segment size defines the segment size by one or more of: a time duration and a particular number of frames.

13. One or more non-transitory computer-readable media having computer executable instructions stored thereon, which in response to being executed by a computing system cause the computing system to perform the method according to claim 6.

14. A system comprising:
one or more computer-readable media having instructions stored thereon; and
one or more hardware processors configured to, in response to execution of the instructions, cause the system to perform operations comprising:
receiving source video data that includes a plurality of frames of video material;
receiving data defining a uniform segment size of a plurality of segments into which at least a portion of the video material is to be divided when transmitted by a distributor, the segment size having a uniform duration associated therewith such that each segment of the plurality of segments has a same duration;
identifying, by analyzing the source video data, an insertion zone within image content of the video material that is suitable for receiving a video object;
identifying selected frames of the plurality of frames of the video material that include the insertion zone in response to the selected frames including the insertion zone, the selected frames being sequential with respect to each other and having a starting frame included in a first particular segment of the plurality of segments;
identifying, based on a relationship between the duration of the segment size and occurrence of the starting frame, a first boundary point of the source video data that occurs at a multiple of the duration of the segment size, the first boundary point occurring before the starting frame and corresponding to an earliest frame of the first particular segment; the plurality of frames including a sub-set of frames that is a sequence of frames that starts at the earliest frame such that the first boundary point defines the sub-set of frames in a manner that the sub-set of frames includes the selected frames and the sub-set of frames includes the first particular segment as a whole segment having the segment size;
embedding, based on the identified insertion zone, a video object within the insertion zone of the image content of each respective selected frame such that the video object appears as part of the image content of each of the selected video frames; and
creating output video data based on the sub-set of frames in response to the sub-set of frames including the plurality of selected frames and in response to the sub-set of frames including the first particular segment as a whole segment, the output video data including only a modified sub-set of frames of the plurality of frames, the modified sub-set of frames being the sequence of frames that starts at the earliest frame of the first particular segment and including the plurality of selected frames with the video object embedded therein.

15. The system of claim 14, wherein the operations further comprise determining a first point in time of the video material that the starting frame of the selected frames occurs, wherein identifying the first boundary point based on the segment size and the starting frame includes identifying the first boundary point based on the first point in time and the segment size.

16. The system of claim 14, wherein the selected frames include an ending frame included in a second particular segment of the plurality of segments and wherein the operations further comprise:
identifying, based on the duration of the segment size and based on occurrence of the ending frame, a second boundary point of the source video data that corresponds to a latest frame of the second particular segment, wherein the sub-set of frames ends at the latest frame of the second particular segment such that the first boundary point and the second boundary point define the sub-set of frames in a manner that the sub-set of frames includes the selected frames and each segment included in the sub-set of frames is included as a whole segment and wherein the modified sub-set of frames ends at the latest frame of the second particular segment such that each segment included in the modified sub-set of frames is included as a whole segment.

17. The system of claim 16, wherein the operations further comprise:
determining a first point in time of the video material that the starting frame of the selected frames occurs, wherein identifying the first boundary point based on the segment size and the starting frame includes identifying the first boundary point based on the first point in time and the segment size; and
determining a second point in time of the video material that the ending frame of the selected frames occurs, wherein identifying the second boundary point based on the segment size and the ending frame includes identifying the second boundary point based on the second point in time and the segment size, wherein the second particular segment is the same segment as or a different segment from the first particular segment.

18. The system of claim 14, wherein the output video data includes metadata that includes one or more of the following:
timing information related to occurrence of the first boundary point;
timing information related to a duration of presentation of the modified sub-set of frames; and
a number of frames of the modified sub-set of frames.

19. The system of claim 14, wherein the output video data includes a tracking pixel configured to transmit a message as a result of the modified sub-set of frames being presented.

20. The system of claim 14, wherein the data defining the segment size defines the segment size by one or more of a time duration and a particular number of frames.

* * * * *

UNITED STATES PATENT AND TRADEMARK OFFICE
CERTIFICATE OF CORRECTION

PATENT NO. : 10,841,667 B2
APPLICATION NO. : 16/161750
DATED : November 17, 2020
INVENTOR(S) : Ram Srinivasan and Phillip McLauchlan It is certified that error appears in the above-identified patent and that said Letters Patent is hereby corrected as shown below:

In the Specification

Column 7, Line 53, delete "is" and insert -- as --, therefore.

Column 8, Line 24, delete "DR" and insert -- IDR --, therefore.

Column 8, Line 26, delete "DR" and insert -- IDR --, therefore.

Column 8, Line 29, delete "DR" and insert -- IDR --, therefore.

Column 8, Line 31, delete "DR" and insert -- IDR --, therefore.

Column 8, Line 32, delete "DR" and insert -- IDR --, therefore.

Column 9, Line 12, delete "DR" and insert -- IDR --, therefore.

Column 9, Line 45, delete "DR" and insert -- IDR --, therefore.

Column 9, Line 47, delete "DR" and insert -- IDR --, therefore.

Column 9, Line 66, delete "zones" and insert -- zone --, therefore.

Column 10, Line 12, delete "DR" and insert -- IDR --, therefore.

Column 11, Line 25, delete "data".

Column 14, Line 8, delete "There" and insert -- The --, therefore.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*